Jan. 3, 1939.  S. W. SPARKS  2,142,704
METHOD OF METAL FLOW AND EQUALIZED TEMPERATURE
AND IN EXTRUSION APPARATUS THEREFOR
Filed Feb. 28, 1936   9 Sheets-Sheet 5
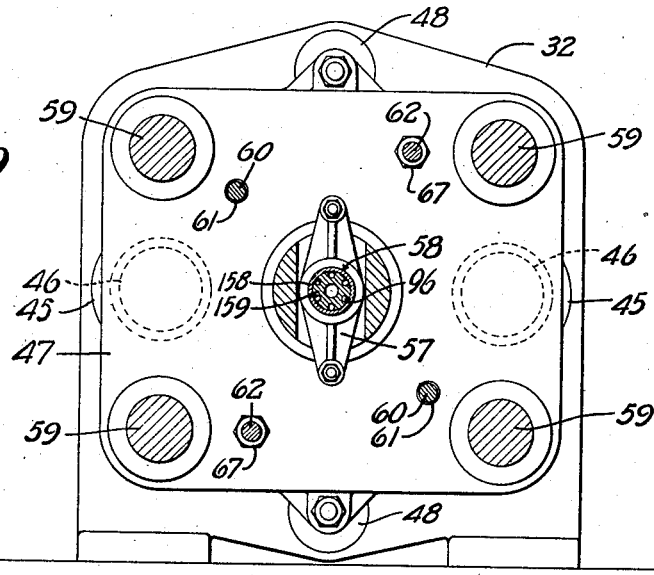
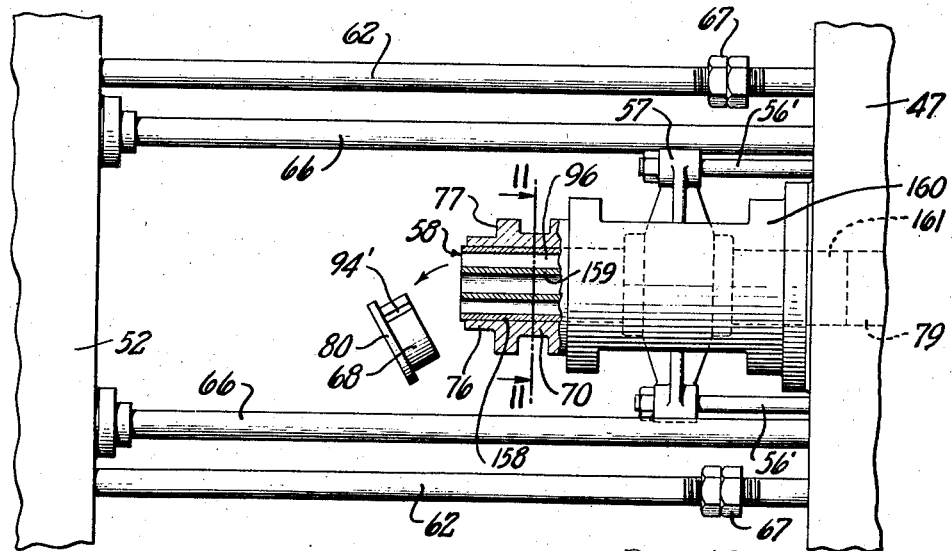
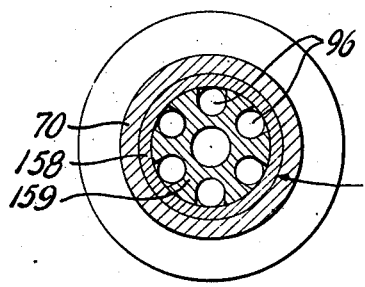
INVENTOR
Stanley W. Sparks
BY
ATTORNEY Jan. 3, 1939.  S. W. SPARKS  2,142,704
METHOD OF METAL FLOW AND EQUALIZED TEMPERATURE
AND IN EXTRUSION APPARATUS THEREFOR
Filed Feb. 28, 1936  9 Sheets-Sheet 6

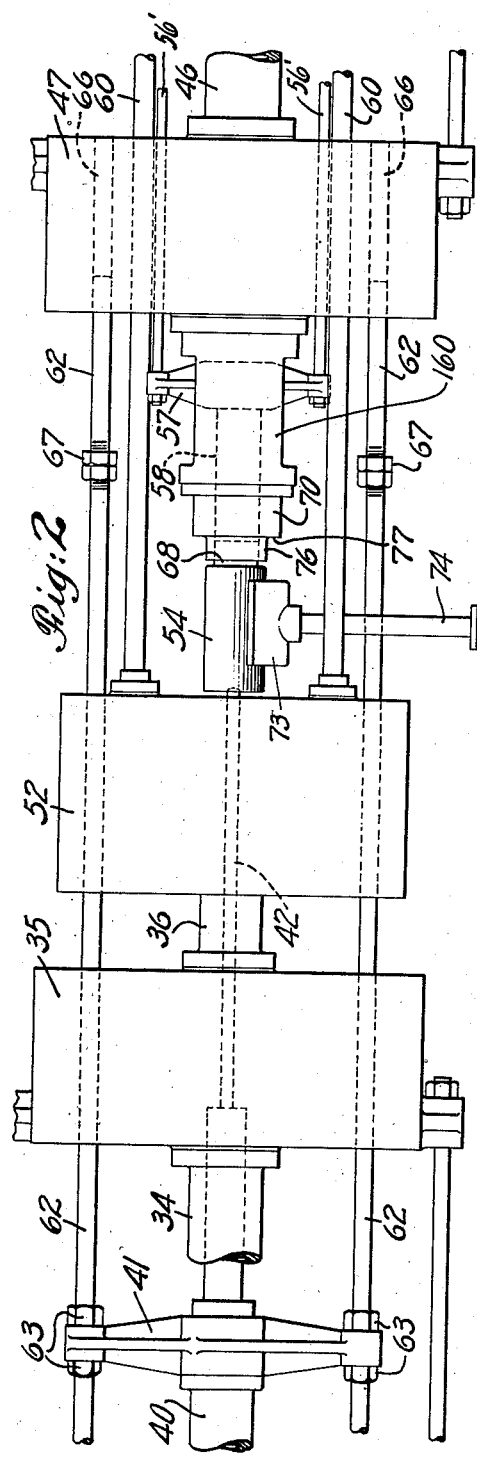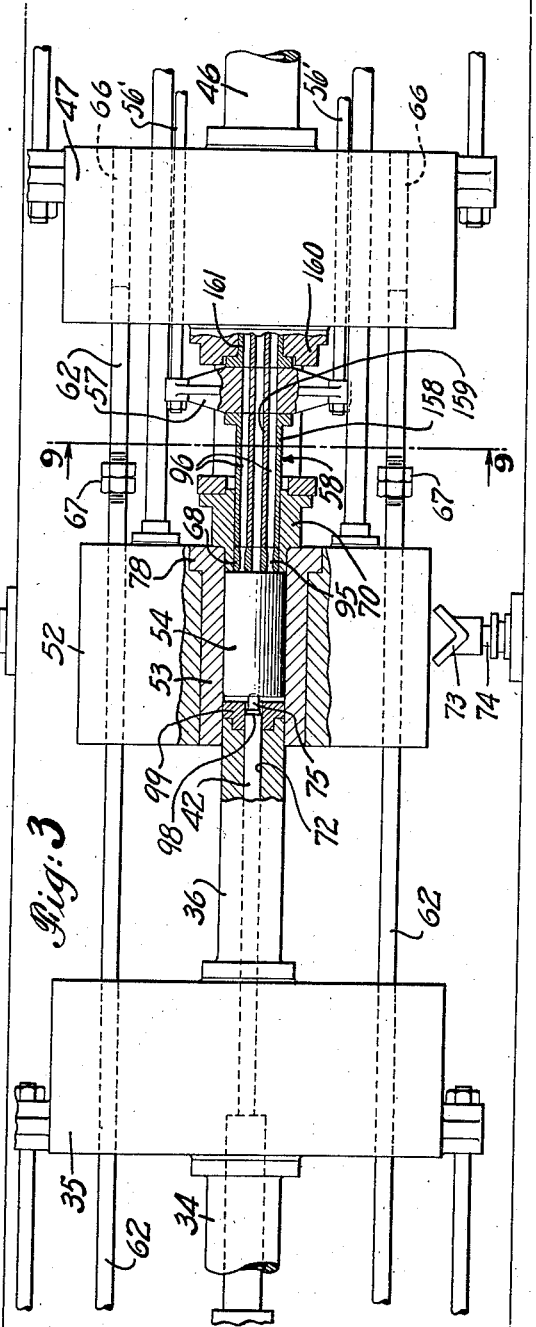

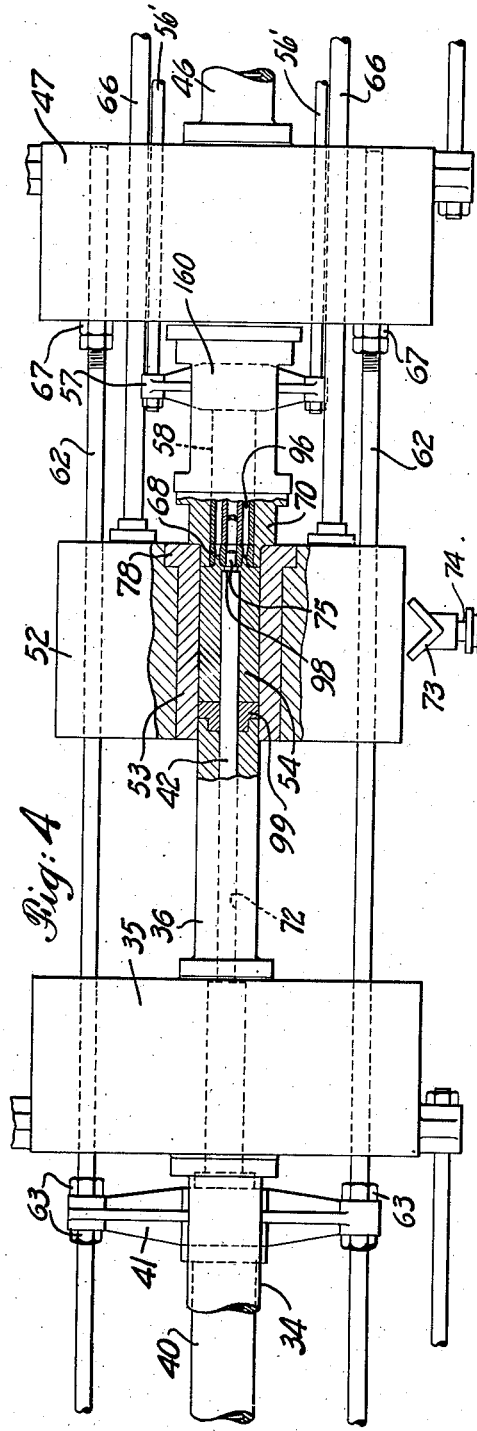
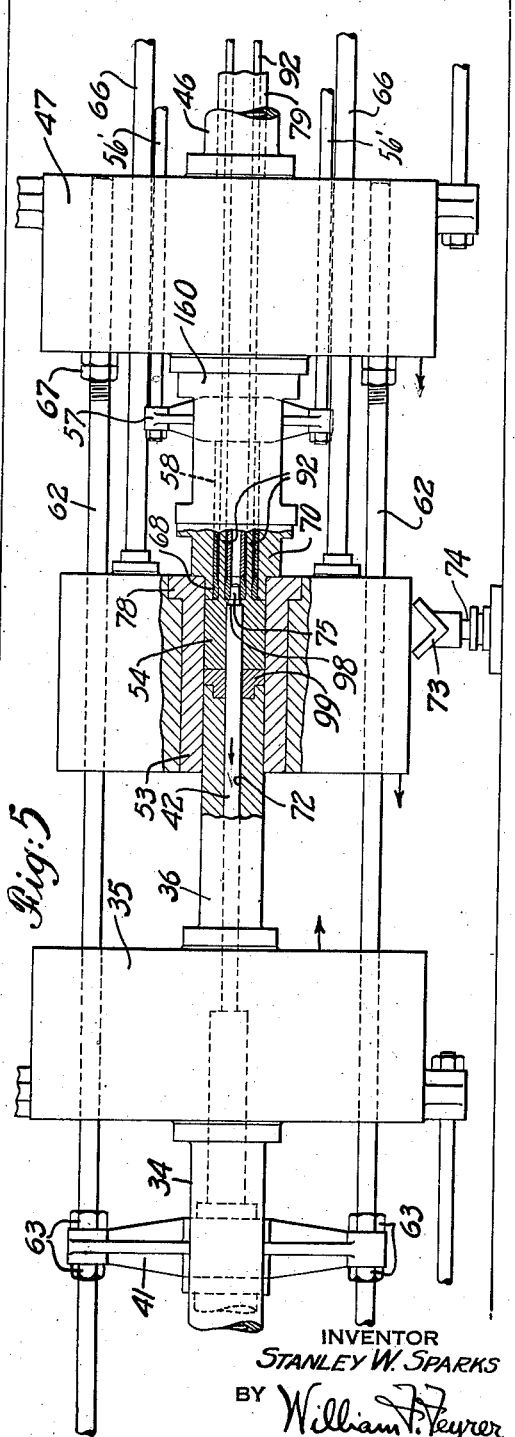

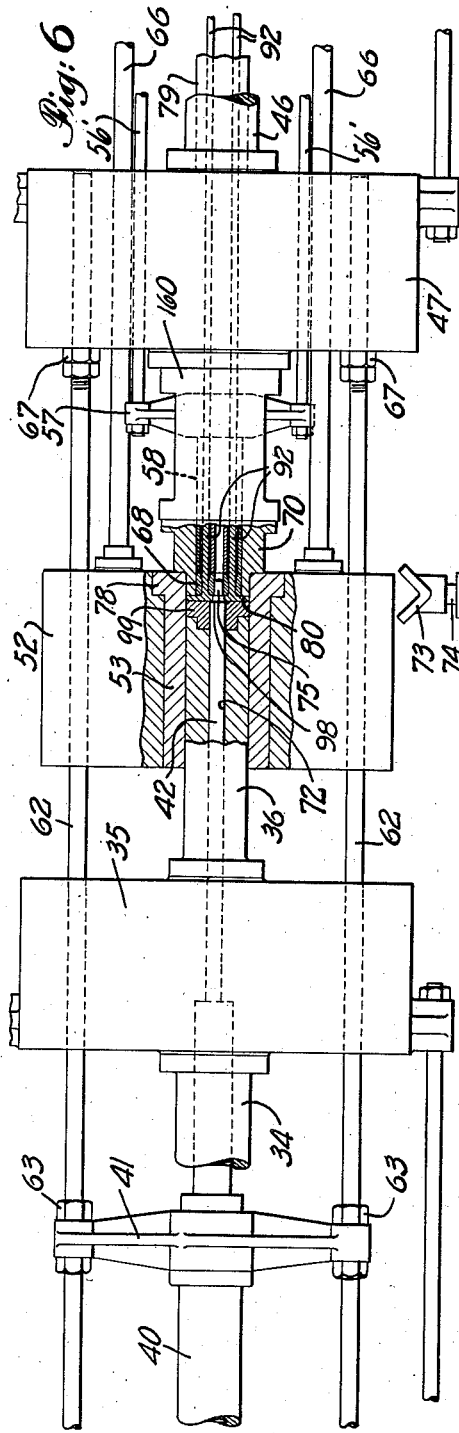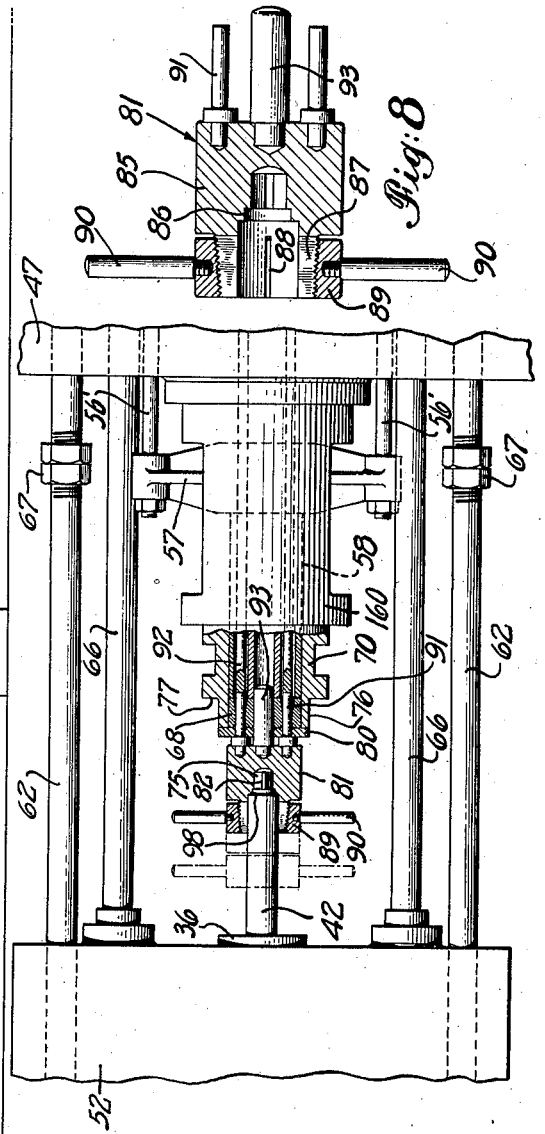

INVENTOR
STANLEY W. SPARKS
BY William F. Veyrer
ATTORNEY

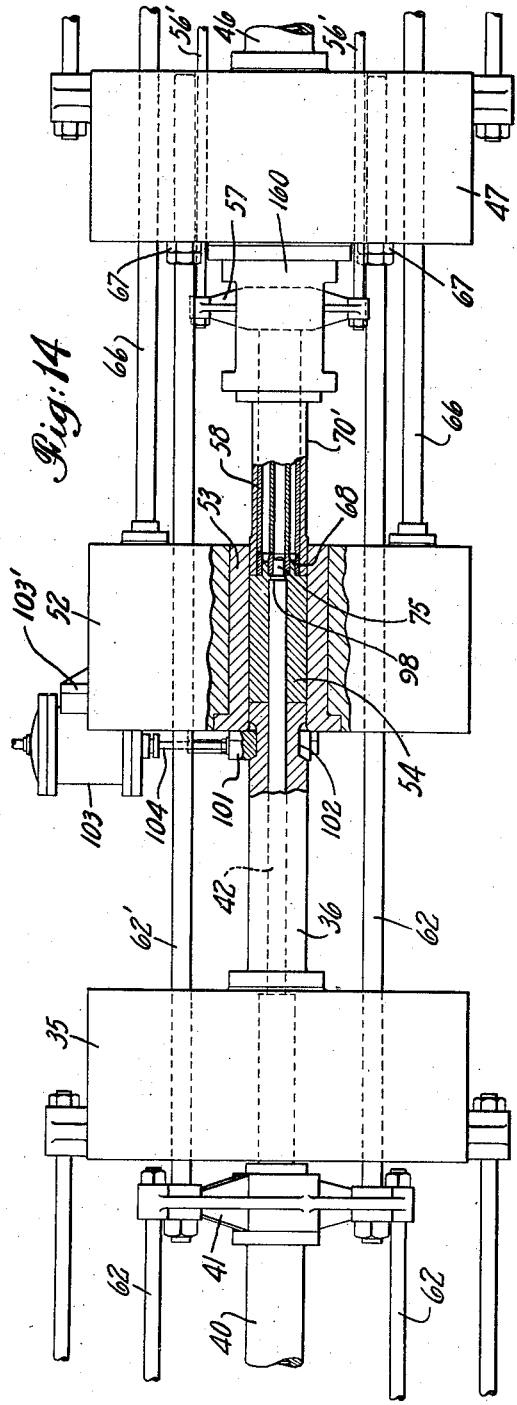
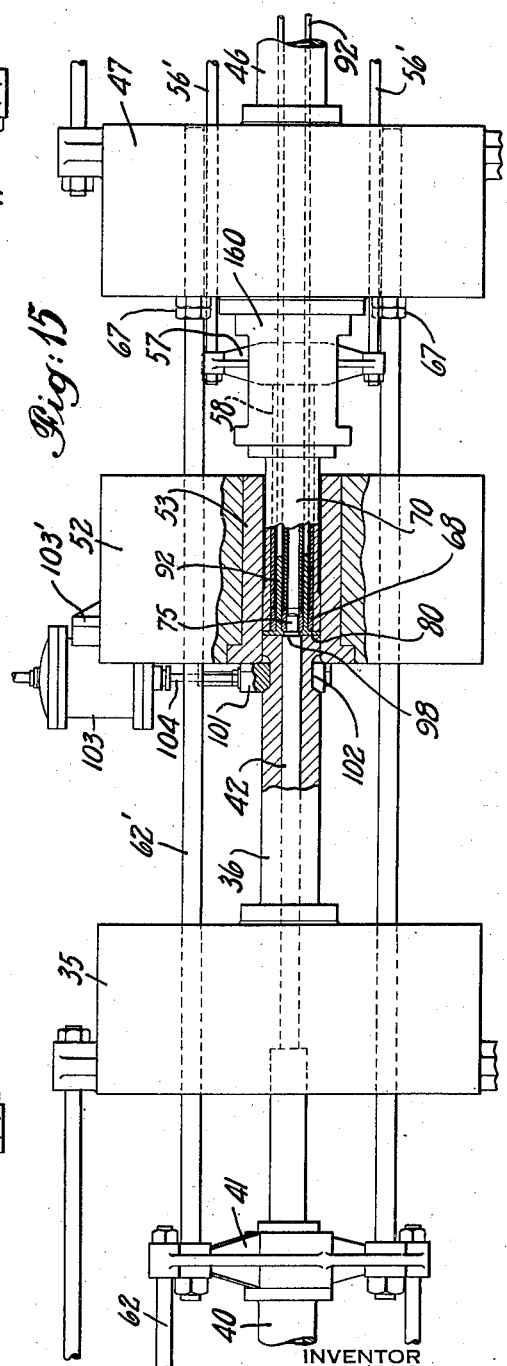

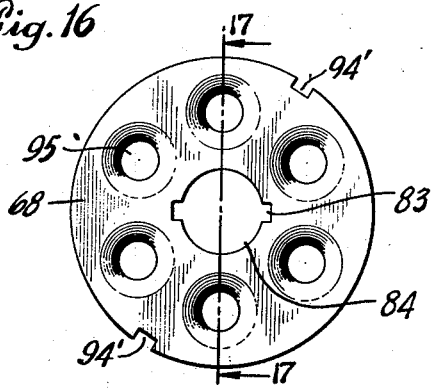
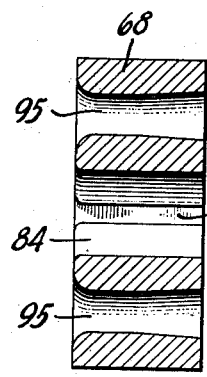
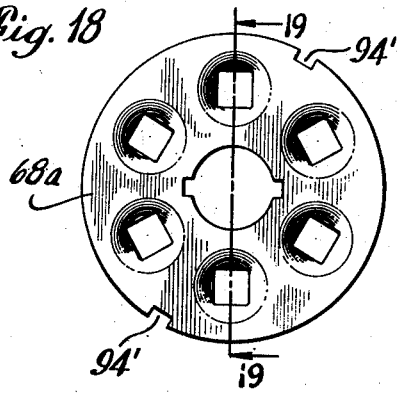
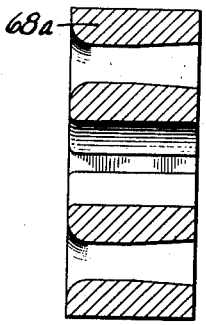
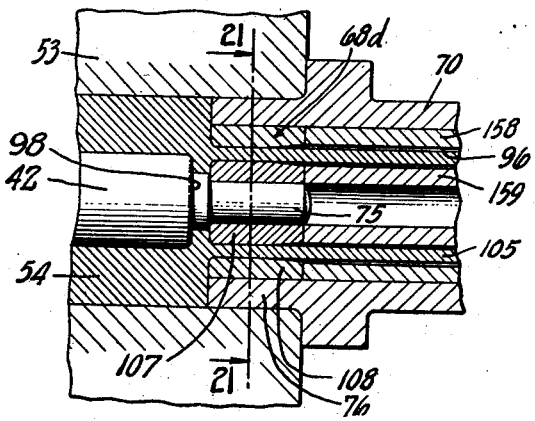
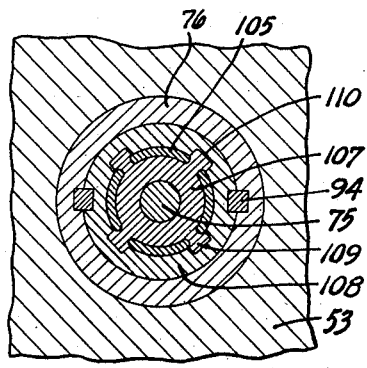

INVENTOR
STANLEY W. SPARKS
BY William F. Veyrer
ATTORNEY

Patented Jan. 3, 1939

2,142,704

UNITED STATES PATENT OFFICE 2,142,704

METHOD OF METAL FLOW AND EQUALIZED TEMPERATURE AND IN EXTRUSION APPARATUS THEREFOR

Stanley W. Sparks, Norwalk, Conn., assignor to Sparks Processes, Inc., Norwalk, Conn., a corporation of Connecticut Application February 28, 1936, Serial No. 66,189

22 Claims. (Cl. 207—10)

This invention relates to the economical single and multiple production of elongated solid and hollow metal shapes by hot extrusion.

Rapidity of operation is very important in the successful extrusion of metals, and particularly of ferrous metals, since unless the high degree of plasticity of the metal can be maintained in the blank being extruded, and the rapid flow of the metal through the container and die is effected, enormous power is required to complete the extrusion. Consequently, the wear on the die and other parts due to friction and the deleterious effect resulting from prolonged heating thereof is so great as to render the extrusion cost excessive. This is one of the primary reasons why the extrusion of ferrous and non-ferrous metals has not been done more extensively.

It is one of the objects of the present invention to provide an apparatus capable of extruding metal shapes in a very advantageous manner in order to reduce the pressures required, and especially to reduce the operating and tool costs.

In meeting this object the present invention provides apparatus which may be very quickly charged with a hot billet or plastic metal blank, and which is capable of pressing and extruding the heated plastic metal thereof quickly through the die and machine. To this end, also, the present invention provides apparatus for accomplishing the high speed extrusion even though the moving parts of the machine are advantageously moved at a normal speed, through the provision of apparatus adapted to effect compound movement, for either direct extrusion wherein the die is stationary relative to the container or indirect extrusion wherein the die is moved into a container which carries the blank.

The die, liners, and tools in any hot extrusion apparatus are subject to the greatest wear by heating since they are affected by both normal heat of the plastic blank by radiation before pressure is applied, and also to the deleterious effect of heating by conduction while pressure is applied in making the desired reduction in the size of the blank when the metal is forced through a shape forming orifice. If the die is used for further extrusion after it becomes excessively heated, deleterious and excessive wear occurs. However, in apparatus heretofore provided, the replacement of a hot die with a cool one could be effected only with a great deal of inconvenience. The present invention provides a novel apparatus for automatically ejecting the heated die and automatically preparing a nest for the cool die. This advantageous apparatus thereby reduces tool cost, increases the production of the machine, and lessens the possibility of an operator being harmed by manual handling of the heated die.

The most important disadvantage of extrusion apparatus and processes heretofore proposed was the folding-back and building-up of laminations in the metal blank within the container which made it necessary to apply excessive pressures during the extrusion and caused a transference of these tremendous pressures to the die where it caused excessive wear, and also caused the adverse building up of laminations on the extruded metal shape itself. These factors resulted in the scrapping of approximately twenty-five per cent of all the metal placed in the machine for the purpose of extrusion, and necessitated costly reheating and repouring before the scrap material could again be used.

The present invention provides a very novel and advantageous process and apparatus for overcoming this major disadvantage which has above all other things tended to limit the extent to which extrusion has been used in the industries and of changing commercially impractical efforts of the past into thoroughly practical ones.

While working out the problems involved in the art of multi-shape and multi-tube extrusion, the inventor made some important developments relative to the extrusion flow of metal when extruding either solid or tubular shapes of ferrous or non-ferrous metals, that resulted in a new invention. The purpose of this new process is to approximately balance or equalize the temperatures of the heated blank during the entire extrusion movement of the metal.

When reducing the cross section area of a uniformly heated blank by rolling or by extrusion, and elongating same into a solid or tubular shape having a smaller cross sectional area, the reduction pressures applied to the outer surfaces of the blank, directly react on the metal around the axis of same. This causes the metal to flow in a direction opposite to the flow of the metal from the outer surfaces (see arrows in Figure 24). In hot extrusion, the same conditions prevail when extruding a solid blank through a central orifice; see Figure 25. This condition is due to the inability to control the temperatures of the blank after it has been withdrawn from the furnace.

The metal blank quickly radiates its heat from the outer surfaces into the atmosphere until it reaches the confines of the container. When it comes into contact with the walls of the container and the tools, which are cooler than the blank, there is a further surface loss of heat because the heat prior to and during the actual extrusion flow is speedily radiated into the walls of the container and into the surfaces of the tools. These effects lower the temperature of the surface of the blank and, to a lesser degree, the inner temperature. This decreases the plastic condition of the metal of the blank at its outer or surface portions more than in the center. Therefore, when pressure is applied to the ends of the blank, this pressure is transmitted to the outside surfaces of the same, parallel to the axis thereof. The accumulative pressures in the surfaces of the blank are caused by the static resistance of the metal against being forced through the restricted orifice of the forming-die whenever the center of the forming-die coincides with the axis of the blank. As the less plastic metal from the surfaces of the blank is forced into the mouth of the die and moves toward the point of the least resistance, which is its center, the more plastic metal in the center of the blank, with its higher temperatures and greater plasticity, is diffused fanwise into the molecular structure of the outer surface of the blank, which is flowing in the direction of the die opening.

As long as there is a sufficient volume of forward flowing metal, within which the backward flow of the more plastic metal can be molecularly diffused, all the metal will flow freely. However, when approximately one-half to two-thirds of the blank has been extruded, the volume of the unextruded portion is not sufficient to absorb the backward flow of the hotter metal from the center of the blank, and the less plastic surfaces of the metal then begin to fold inwardly behind the changed directional flow of the metal from the center of the blank. This choking of metal flow combined with the rapid cooling of the same, forms laminations within the structure of the unextruded portion of the blank which require enormous pressures to flow, and if with excessive pressures the laminated stub of the blank is forced out of the die, an elongated lamination or laminations will appear in the structure of the finished product.

When extruding solid shapes through axial orifices, tests have proven conclusively that when heated and plastic metal, with different temperatures in its structure, starts to fold and form laminations, then the free extrusion flow of metal ceases, regardless of the amount of pressure applied thereto. This always results in an unextruded stub remaining in the container, the volume of which is approximately 25% of the blank's original length and weight. This is waste scrap and must be melted over again to be used.

The inventor further determined, when performing a central solid shape extrusion operation wherein no medium was provided to prevent or retard the backward flow of the metal in the center of the blank which combined with the unequal temperatures in the structure of the metal, it was necessary to use extremely high extrusion pressures to flow the metal, even when only making relatively small reductions in cross-section area. These higher extrusion pressures always react deleteriously upon the surfaces of the tools.

In the present commercial methods of non-ferrous metal extrusion, when extruding one solid shape the loss in unextruded stub averages approximately 25% in each operation and likewise there is the same loss in multi-shape extrusion which is limited to extruding not more than four rods from a solid, unworked, cast blank through forming-holes centrally located within the die. There is also considerable loss due to severing the rods from the stub of unextruded metal.

Figures 1–6, 12, 13, 20, 22 and 23 show the different stages of metal during the novel and advantageous extrusion operations and process hereinafter described.

Figures 24, 25 and 26 diagrammatically show the conditions of metal flow in heretofore proposed extrusion and rolling processes.

The fundamental principle involved in this new and novel method of ferrous and non-ferrous metal extrusion, is to provide a practical high-speed means of extruding into elongated shapes, a plastically heated, unworked, or semi-worked blank. By first preworking the blank before extrusion, thereby substantially equalizing and uniformly distributing the temperatures thereof, a uniform uni-directional flow of the metal is produced resulting in less pressure being needed to flow the metal freely and more completely out of the container through the forming holes of the die.

In accordance with this invention there is provided an improved method of extruding metal shapes which comprises placing a heated and plastic metal blank into the chamber of a container, forcing into said metal blank a tool which is so proportioned relative to the size of the blank and/or the chamber as to effect a marked approach toward equalizing the inner and outer temperatures of said blank, and compressing the blank in the chamber to extrude the metal therefrom.

In accordance with a further feature of the invention, and in the case where solid metal shapes are to be extruded, the end of the tool is maintained out of and in predetermined spaced relation relative to a shape forming orifice in the die, while in the extrusion of hollow metal shapes, a reduced forming mandrel on the tool is maintained within and in predetermined relation to the shape forming orifice in the die.

The invention further provides an improved apparatus for extruding metal shapes, comprising an extrusion press having a ram, a die and a container for supporting a heated metal blank, and including an equalizing tool or mandrel arranged to be forced into the heated metal blank to equalize the inner and outer temperatures of the blank during the extrusion of said blank by compression in the container between the die and ram.

When extruding solid shapes, such as rods, bars, rails, structural forms, strips or tubes, single or in multiple, by this new process the sequence of operation is as follows: the heated plastic metal blank is quickly projected into a container and closely confined therein by closing the openings of the container. Simultaneous with the complete confinement of the blank, a high-speed piercing and equalizing tool is forced into the same; see Figure 4. In performing any size or shape extrusion operation by this process, the size of the piercing and equalizing tool is preferably not less than one-third the size of the metal blank when it fills the container and/or the size of the extrusion chamber of the container. As the piercer moves into the blank, the metal from the hole so formed elongates the blank, (differences as shown between Figures 3 and 4) and at the same time, by the displacement of the hotter metal from the center of the blank, its higher temperatures are distributed into the walls of the thick-wall tube so formed, by the backward flow of the metal around the piercer, or in other words a substantial approach toward equalizing the inner and outer temperatures of the blank is accomplished, which prevents folding back and building up of laminations. Also, some of the heat from the center of the blank is radiated into the surfaces of the piercer, which further balances the temperatures in the inner and outer walls of the so formed tube blank. From this tube, or preworked billet, solid or tubular shapes, either single or in multiple are advantageously extruded in the form desired.

Some of the principal advantages of this new form of extrusion metal flow are as follows:

*First.*—The preworking of base or semi-base metal blanks before extrusion and balancing and equalizing the temperatures thereof.

*Second.*—By the stationary positioning of the enlarged piercer and equalizer in relation to the die when extruding solid or tubular shapes, a freer flow of metal in the direction of the extrusion is obtained.

*Third.*—The control and the prevention of the backward flow of metal which causes laminations or folding of the metal at the end of the blank when its outer surfaces have lost a considerable amount of their plasticity near the end of the extrusion operation.

*Fourth.*—The freer and less restricted flow of metal permits the use of lower extrusion pressures, which are reflected in less pressure wear on the dies, tools, and container walls.

*Fifth.*—By this new method of controlling the direction of extrusion metal flow, long length, multi-shapes can be extruded, thus greatly increasing the production of a single extrusion unit.

*Sixth.*—By forming a relatively large bore in the blank and thereby reducing the cross sectional area more satisfactory low pressures and more compact apparatus may be used.

In order that this invention may be clearly understood and readily carried into effect, the same will now be more fully described, with reference to the accompanying drawings, illustrating by way of example, several embodiments of the invention, and in which:

Figure 2 is a side view of the central portion of the apparatus, with the heated metal blank in initially charged position and with the piercing tool and die gripping the ends of the blank;

Figure 3 is a view similar to Figure 2, showing the container moved over to enclose the blank, and illustrating the apparatus for direct extrusion;

Figure 4 is a view like Figure 3 showing a die for the extruding of solid rods, and showing the piercing and equalizing tool at the completion of the piercing stroke;

Figure 5 is a view similar to Figure 4, showing the die and the now associated container moved as one unit toward the left, and the ram moved toward the right to extrude metal of the blank through the die;

Figure 6 is a view similar to Figure 5, showing the die and associated container, and the ram at the end of the extrusion stroke;

Figure 7 shows the stripping tool on the end of the piercing tool, at the end of the stripping operation;

Figure 8 is an enlarged sectional view of the stripping tool;

Figure 9 is a transverse sectional view taken through the apparatus on the line 9—9 of Figure 3;

Figure 10 is a fragmentary detail, showing the die being ejected;

Figure 11 is an enlarged section, taken on the line 11—11 of Figure 10, showing the means for guiding a plurality of extruded rods from the machine;

Figure 14 is a view similar to Figure 3, but showing the indirect extrusion of a plurality of solid rods;

Figure 15 is a view like Figure 14 showing the die and the ram and associated container at the end of the indirect extrusion operation;

Figure 16 is a face view of a die for forming a plurality of round rods;

Figure 17 is a sectional view taken on the line 17—17 of Figure 16;

Figure 18 is a face view of the die for forming a plurality of square rods;

Figure 19 is a sectonal view taken on the line 19—19 of Figure 18;

Figure 20 is a fragmentary sectional view of the die and associated means for forming a plurality of strips;

Figure 21 is a sectional view taken on the line 21—21 of Figure 20;

Figure 25:
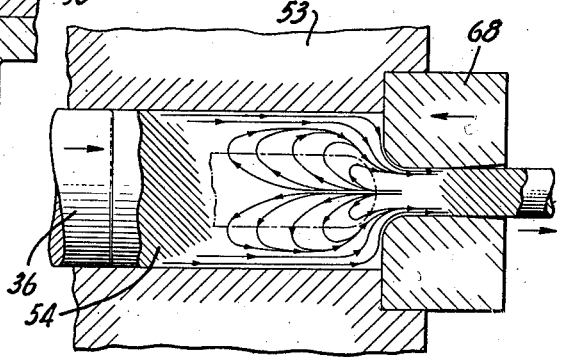
Figure 26:
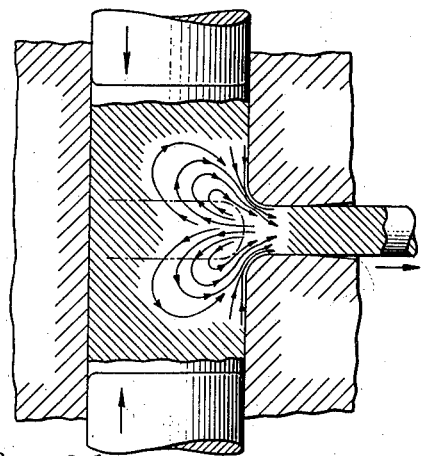

Figure 25 is a view showing the same back flow occurring while a heated blank or billet is being extruded through an orifice in the direction of the line of extrusion pressure application, with dot and dash lines showing the new principle to prevent back flow; and Figure 26 is a view showing an analogous back flow occurring while a heated blank or billet is being extruded through an orifice in a direction perpendicular to such pressure line, the dot and dash lines therein showing the new principle to prevent the adverse back flow.

Figure 1:
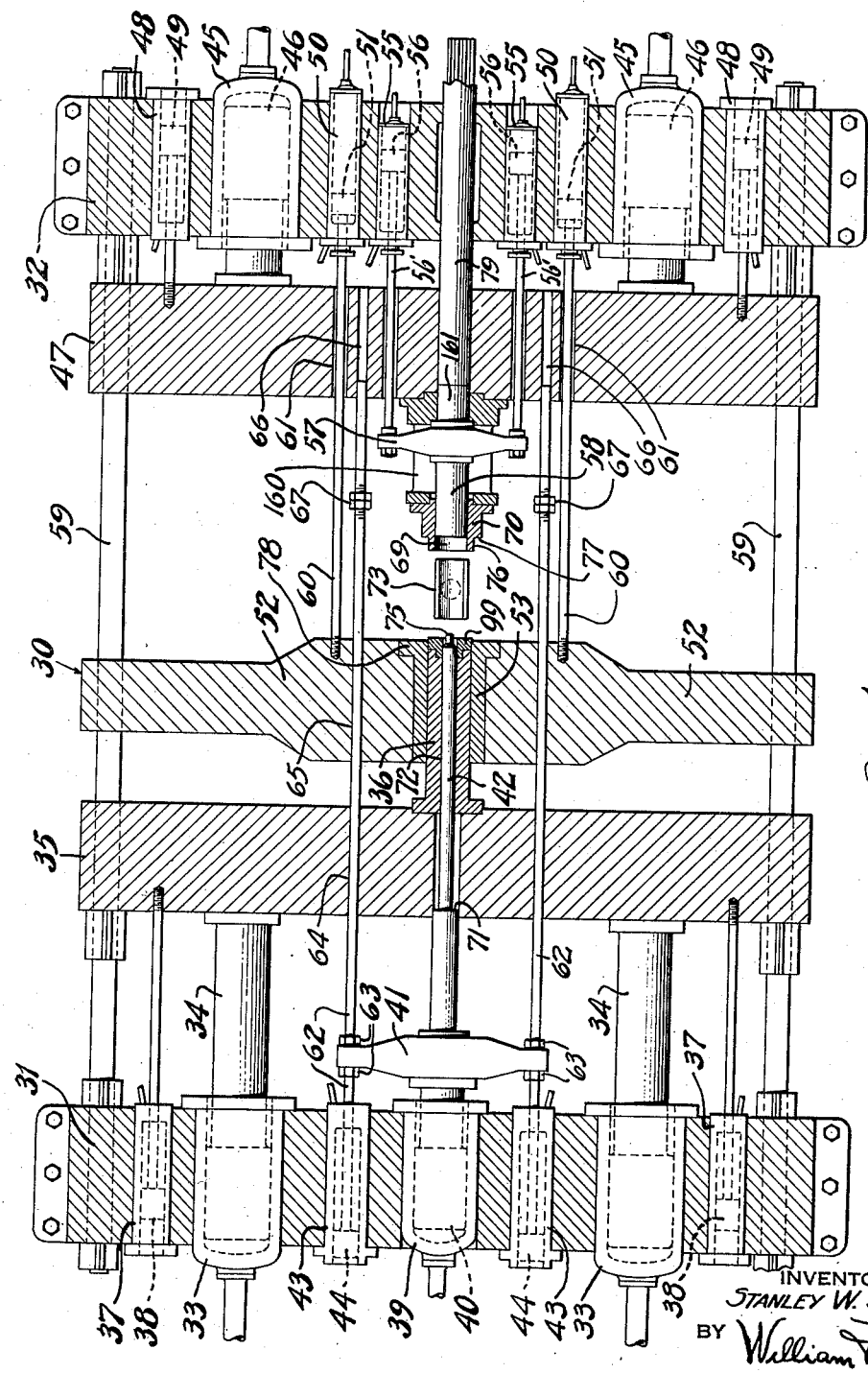
Figure 1 is a somewhat diagrammatic view of the complete apparatus.

Referring to the drawings in detail, various pressure cylinders of a duplex hydraulic press 30 are located in housings 31 and 32 shown at opposite ends of the apparatus in Figure 1. Said cylinders are formed in the usual or any suitable manner and have pistons for operating in timed relation the various moving parts of the apparatus.

The housing 31 at the left in Figure 1 has two cylinders 33 for the advancing pistons 34 of a cross-head 35 carrying a ram 36, that is, for moving this cross-head to the right as viewed in Figure 1; and two smaller cylinders 37 with retracting pistons 38 for this cross-head. This housing also has a cylinder 39 for an advancing piston 40 of a cross-head 41 carrying a piercing and equalizing tool 42, that is, to move this tool also to the right in Figure 1 and a pair of cylinders 43 for retracting pistons 44 for this cross-head.

The housing 32 at the right in Figure 1 has two cylinders 45 for advancing pistons 46 of a cross-head 47 carrying a die, that is, for moving this cross-head to the left as viewed in Figure 1; and a pair of cylinders 48 for retracting pistons 49 for this cross-head. This housing also has cylinders 50 for two double-acting pistons 51 for advancing and retracting a cross-head 52 carrying the container 53 for a billet or heated and plastic metal blank 54 and a pair of cylinders 55 for two other double-acting pistons 56 for advancing and retracting a cross-head 57 carrying a die ejector 58. All of the cylinders and pistons being of course provided with the required ports and connections to allow them to be moved by any suitable fluid pressure.

The three larger cross-heads 35, 47 and 52 all reciprocate on tie rods 59 extending between and joining said two end housings 31 and 32. The cross-head 52 which carries the container 53 is connected to its double-acting pistons 51 by connections 60 passing slidably through openings 61 in the cross-head 47. The cross-head 41 carrying the piercing tool 42 is connected to its retracting pistons 44 by rods 62, to which rods this cross-head is secured by nuts 63, and these rods extend slidably through openings 64 and 65 in the two adjacent cross-heads 35 and 52 respectively and extend slidably into openings 66 in the die carrying cross-head 47. Stops 67 are provided on these rods for limiting movements of the piercing and equalizing tool 42 toward the die, such as 68, Figure 16, such die being seated in a receiving recess or nest 69 in a die head 70, see Figure 1.

The piercing and equalizing tool 42 adjacent to its cross-head 41 has a portion 42' of large diameter and beyond this the tool is reduced in cross-section to provide a shoulder 71, said portion of largest diameter fitting slidably within an opening extending through the cross-head 35, the forward end portion of the tool of reduced cross-section fitting slidably within an opening 72 running through the ram 36, and said shoulder being positioned to coact with the left end of the ram when the piercing and equalizing tool has been advanced the proper distance through the ram.

In Figure 1 no die is shown in place in the recess or nest 69 of the die head 70, but some of the many employable dies are shown and described in the other views (e. g. Figures 16–21).

Near the center of Figures 1 and 2 is indicated one form of loading mechanism a cradle 73 on which is placed a highly heated and plastic metal blank 54. This cradle is carried at the top of a vertically movable fluid actuated plunger 74; and in Figure 2 the cradle is shown still elevated. Such cradle, however, is about to be lowered, as shown in Figure 3, because Figure 2 illustrates the completion of the initial operation of the apparatus, to wit, a sufficient but a very slight movement of the cross-head 41 to the right to advance the nose 75 of the tool 42 to engage the left end of the blank and coact with the die to grip and hold the same in place in readiness for the next operation.

The conclusion of said next operation is shown in Figure 3. Here the blank 54 still held between the piercing and equalizing tool 42 and the die 68, is wholly within the container 53. In other words, the cross-head 52 carrying such container has now been moved toward the right to an extent indicated from a comparison of Figures 2 and 3. The container has advanced to its limit of rightward travel and the reduced forward portion 76 of the die-head 70 has fully entered within the right-hand end of the container with a shoulder 77 thereon close up against the outer face of the right-hand end of the container liner where the latter is strengthened and made more massive by a heavy external flange 78. Said shoulder, also, makes the die-head stronger and more massive against expansional stresses, beyond the container, during extrusion of the metal through the die 68 therein.

In Figure 4, the next step is shown completely performed, to wit, the piercing of the blank and the substantial equalizing of the temperature, preferably from end to end by the piercing and equalizing tool 42. The die 68 and its cross-head 47, the container 53 and its cross-head 52, and the ram 36 and its cross-head 35 are all as they were in Figure 3, but the cross-head 41 has advanced sufficiently to the right to bring the stops 67 on its rods 62 against the die carrying cross-head 47. Thus, the tool 42 is maintained in predetermined relation to the die during extrusion.

It is this piercing of the hot and plastic blank, with an equalizing tool of substantial size, preferably at least one-third the size of the blank when it fills the container, or one-third the size of the container, even when it is desired to extrude solid shapes, which effects a redistribution of the metal and substantially equalizes the inner and outer sections of the blank. The latter equalization is effected by the tool 42 driving the hotter inner metal of the blank toward the outer surface thereof, and by conducting off certain of the heat, in the same manner as the walls of the container take heat from the outer surface thereof.

Referring next to Figure 5, the metal blank 54 is shown about one-half extruded, the hot metal of the blank now being forced to the right through the die 68 and thence through the delivery passages 96 to deliver in the present case a plurality of rods. As made plain by the arrows appearing in this view, the ram 36 is being moved toward the right and the die 68 and the tool 42 are being moved toward the left. Together with the die and tool, the container 53 is also being moved toward the left. Since the die does not move into the container, so-called direct extrusion is effected.

In Figure 6, the operation illustrated as underway in Figure 5 is shown concluded; the parts having advanced as just described until the head of the ram 36 is so close to the die 68 that substantially all the metal of the blank 54 has been extruded through the die, except for that inconsequential amount of metal now constituting a thin-disk-like slug or nubbin 80.

Thereupon, the ram-carrying cross-head 35 is retracted to the left and the die-carrying the cross-head 47 is retracted to the right. Indeed, all the cross-heads at this time are preferably returned to the limits of their retraction strokes, with the single exception of the cross-head 41 carrying the piercing and equalizing tool 42. This cross-head is disposed so that said tool 42 is projected somewhat to the right of the cross-head 52 carrying the container 53 (as shown by dot and dash lines in Figure 7), thereby to allow a quick temporary mounting on the tool 42 of a stripper tool device 81, illustrated in Figure 8.

The device 81 is shown in Figure 7 as already mounted on the piercing and equalizing tool 42 and at the completion of an application thereof to the nubbin 80 to push the formed metal in beyond the die 68, as will be described in a moment; but, of course, during mounting of the device on the tool 42 the tool-carrying crosshead 41 had not as yet been sent to the position shown in Figure 7 following its retraction to the left as above mentioned.

Figure 22:
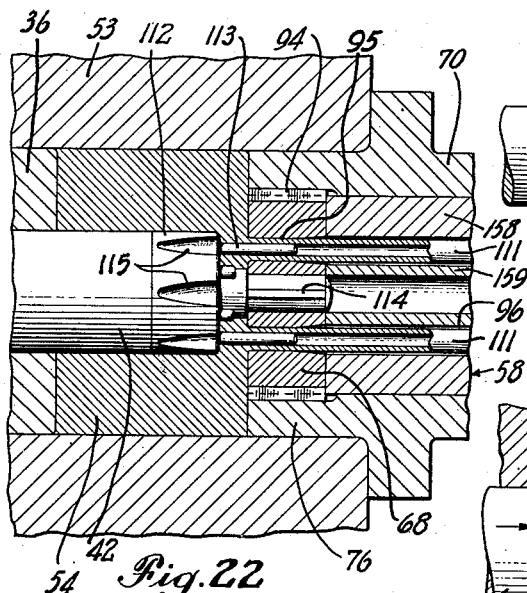
Figure 22 is a fragmentary view, partly in section, of the apparatus used for the direct extrusion of a plurality of tubes.
Figure 23:
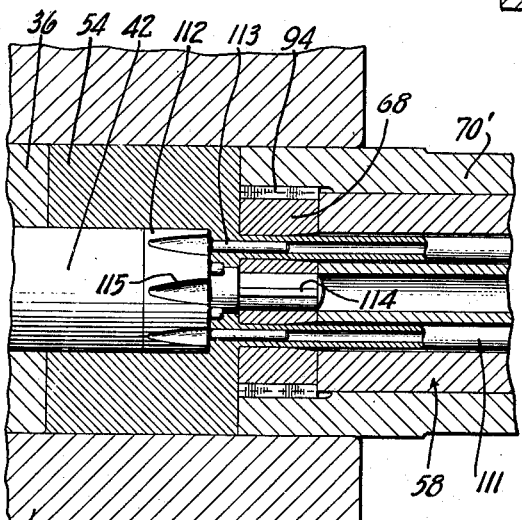
Figure 23 is a view similar to Figure 22, but showing an indirect extrusion apparatus for forming a plurality of tubes.

As shown in Figures 7, 22 and 23 and in certain other views only, the nose 75 of the piercing tool 42 is provided with a key or keys 82, there being preferably two such keys diametrically opposite each other. These keys are for taking matching keyways 82 of a central hole 84 in the die 68, or in a block 85 of the stripper device 81; such hole accommodating the nose 75 of the tool, and in the stripping device being a forward reduced continuation of another recess 86. The latter recess receives a forming shoulder basal to the piercing tool nose, and the recess for receiving the follower length of the piercing tool in rear of such shoulder. Opposite the main length of this last mentioned recess, the block has a conical reduced portion 87 exteriorly threaded as shown, and this thread is interrupted by a plurality of slots 88. Spirally adjustable on this threaded portion is a tightener ring 89 to be manually turned by handles 90. The opposite end of block 85 has projecting therefrom a plurality of smaller pins 91 arranged in a circumferential series, since the die 68 as herein illustrated is for the extrusion of a plurality of circumferentially arranged round rods 92, and also, at the center of the block, a somewhat heavier pin 93. All these pins have their axis parallel with the axis of the recesses in the block for receiving the nose and adjacent portions of the tool 42. The die 68 is fixed in the die-head 70, in agreement with the fixation of the tool 42 against rotation on its cross-head 41 as by keys 94 on the die-head 70 entering slots 94' in the die (see Figures 16, 22 and 23) and with the location on the tool 42 of the keys 82, the circumferential series of extrusion orifices 95 in the die must align with the smaller pins 91 on the block 85, and a central circumferential opening 84 in the die 68 must align with the larger pin 93 on the block, when the device 81 of Figure 8 is tightened up by its handles 90 on the piercing tool. This central opening is smoothly continued by a suitable bore in the ejector 58.

After the device 81 of Figure 8 is thus mounted on the piercing tool 42, the die-carrying crosshead 47 may be given an advancing movement toward the left to bring the parts together or the tool 42 and the stripper device 81 thereon may be brought to the right, or both of these movements effected concurrently, until the die 68 and stripper are in the relation shown in full lines in Figure 7. As a result, the smaller pins 91 are driven through the nubbin 80, breaking away from the same all the extruded rods 92 and sending them toward the right along ejection or delivery passages 96 in the inner member 159, see Figure 11. At the same time, the larger pin 93 is driven through the central hole in the nubbin as left by the location of the nose 75 of the tool 42 at the last stage of the actual extrusion operation previously described. In this connection, see again Figure 6. In providing the large pin 93 to be thus sent through the nubbin, the purpose is to better align the smaller pins 91 with the orifices 95.

Separation of the stripping tool from the die is next effected. When the piercing tool 42 is moved sufficiently to the left to advance the device of Figure 8 now on the same from the full line position to the dot-and-dash line position of Figure 7; all the pins of such device are cleared from the die, and with them the nubbin 80 is stripped from the die. If the pins do not remove the nubbin 80 it may be knocked off the die. The handles 90 are turned to loosen the block 85 from the tool 42 and the device 81 of Figure 8 is removed.

Since the nose 75 of the piercing and equalizing tool 42 is arrested when it attains the position shown in Figure 6, the shoulder 98 thereof will be out of contact with the die 68 a sufficient amount so that the back pressure of the rapidly flowing metal passing thereover will react upon said shoulder to oppose any tendency for any portion of the piercing tool to elongate at the high temperature and pressure to which it is subjected. Since the shoulder is but a short distance from the orifice of the die and the narrow flow point of the metal it directs any metal which may flow rearwardly right back into the metal flow being extruded through the die, and thus prevents the folding back and building up of laminations in the blank as would occur if there was rearward flow of metal back into the center of the blank.

Moreover, by virtue of this stepped-up construction of the piercing tool, the heat is dissipated far more rapidly through the enlarged portions of the tool. Thereby, any tendency for the tool to become excessively heated during the extrusion is prevented.

By this arrangement, also, it is possible to employ an exceedingly sturdy tool 42, and one throughout its principal length of considerable cross-section. The nose 75 is preferably removable as by an interrupted thread (not shown) between it and the forward part of the piercing tool. Such nose is of special configuration having preferably a hemispherical tip.

Such a die 68 as that above referred to in describing Figures 7 and 8, is shown also in Figures 9 and 10; and most clearly in Figures 16 and 17. In these latter views will be noted keyways 83, for taking the keys 82 on the nose 75 of the piercing tool 42, these keys being shown as aforesaid in Figure 7, during that stage of the extrusion when said nose passes into the central opening in the die. The orifices 95 for forming round rods 92 are shown best in Figures 16 and 17, while Figures 18 and 19 illustrate a type of die 68a found to work satisfactorily for the extrusion of a plurality of square rods; the same keyways 83 will be noted.

A removable hollow face block 99 which is mounted upon and has a diameter equal to the diameter of the ram 36 relieves the latter from the brunt of the powerfully projected extrusion stroke and the attendant wear. This block is bored to exactly the diameter of the bore 72 in the ram 36 through which the piercing and equalizing tool 42 extends.

As already stated, frequent replacement of one die by another is desirable; this, to keep the dies cool and to give periods of rest to different dies while others are being used for making a run of extruded articles all alike, or to replace a run of round shapes with a run of square shapes. The present invention provides mechanism to eject a die and substitute a new one at the conclusion of all or some extrusion operations.

Whenever at the conclusion of an extrusion operation, the die then in place is to be removed, this die (68 for example) is ejected by the ejector 58 having associated therewith, as already stated, the pistons 56 of Figure 1. Referring in this connection to Figures 1, 10, and 11, these pistons carry plungers or rods 56' connected to a cross-head 57 carrying an ejector 58 on its forward or left face. The ejector consists of an outer sleeve 158 and, firmly secured therein, an inner member 159 having guide grooves or passages 96 formed in its periphery for guiding and supporting the extruded articles during their passage to the point of delivery outside of the machine to the right of the housing 32. The outer sleeve and associated inner member are secured to the cross-head 57 by screws or any other suitable means. The rear or right end of the inner member 159 abuts on the forward face or cross-head 57. The forward ends of both the sleeve 158 and member 159 are flush and contact with the rear face of the die 68 to prevent the die from moving rearwardly during the extrusion stroke. The cross-head 57 is held against rearward movement during the extrusion stroke by its abutment against the rear wall of the die-head-carrier 160 within which the cross-head 57 reciprocates.

A short guide sleeve 161, secured to the rear face of cross-head 57 by screws or the like, and constructed similar to ejector 58 serves both as a support unit for the cross-head and a guide member for the extruded articles. The passages 96 in the ejector 58 communicate with the corresponding passages in guide sleeve 161 through aligned holes in the body of the cross-head 57.

The guide tube 79, secured in the main cross-head 47, is constructed similar to the ejector 58 and guide sleeve 161 and completes the guide means shown for carrying the extruded articles from the die to a point outside the machine. During the ejection of the die after the stripping operation, the extruded articles rest in the long guide tube 79 and hence do not move with the ejector when same is moving to eject the die.

In order to eject the die to be displaced, the pistons 56 are given a die ejection stroke to the left, moving said cross-head 57 relatively to the die-carrying cross-head 47. Such powerfully applied stroke ejects the die and the same falls free, as shown, or may be ejected upon a suitable hook and crane or the like. Thereupon, said pistons are given retraction strokes to the right, restoring the parts to the condition shown in Figure 1. The replacement die is now put into its receiving recess or nest 69 at the left end of the die head. Suitable positioning means, for instance keys 94 as shown in Figures 22 and 23, are provided to seat the die in this recess so as to position the openings thereof in proper relation to the passages 96 and for aligning at the proper time with the pins 91 when the stripping tool device 81 of Figure 8 is employed, as above explained; the replacement die slipping easily into place because of its relatively low temperature as compared to the temperature of the die mount 70.

The apparatus having been restored to the condition shown in Figure 1, the cradle 73 is again elevated, ready to deliver another highly heated metal blank so that another extrusion operation can be performed, as above described.

Figure 12:
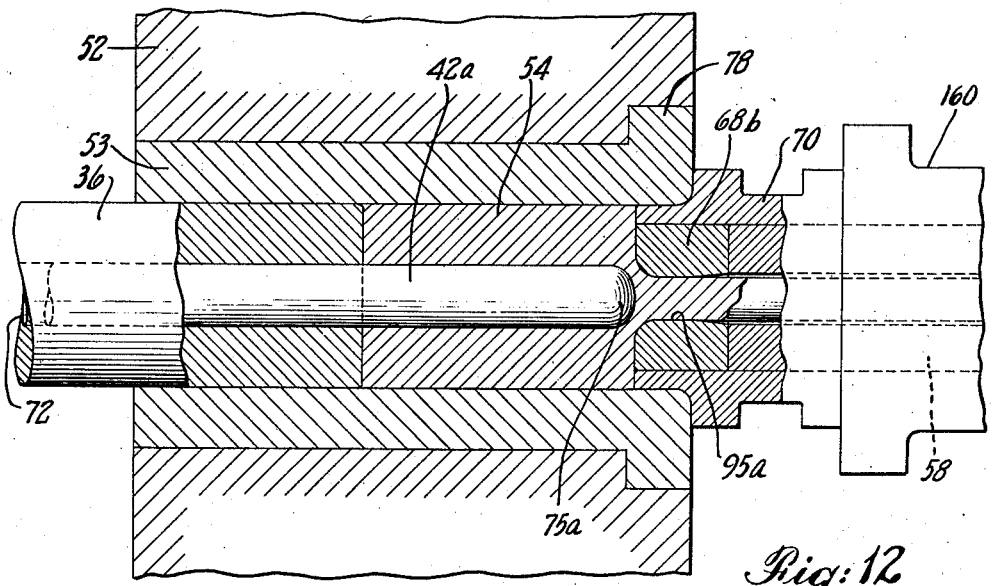
Figure 12 is an enlarged fragmentary view, partly in section, showing the new metal flow principle as applied to the production of a single solid rod.

In Figure 12, which best illustrates the new metal flow principle, is shown a piercing tool 42a differing in shape from the piercing tool 42 of the apparatus above described, and especially adapted for efficient operation during extrusion through the die 68b for forming a single solid rod. In this view, the parts are arranged at about the extrusion stage indicated in Figure 5. The die mount 70, the container 53, and billet 54 are now moving as one unit toward the left and the ram 36 is now moving toward the right, but the piercing and equalizing tool 42a is fixed in relation to the die as by parts 62 and 67 hereinbefore described. These parts are moving to apply extremely high speed endwise pressure to the opposite ends of the confined metal blank 54, to compress it in the container 53 according to the invention. Due in part, also, to the high temperature of the metal blank 54, maintain as such during the extrusion operation because of the rapidity with which the latter is performed according to the invention, there is a thorough working of the metal during the extrusion, and such complete molecular changes occur in the structure of the extruded article that inherent defects of the base metal are eliminated, even when, or rather especialy when, the metal being extruded is a ferrous one, even steel. Furthermore, the shaping of the superficies of each extruded product follow with the most perfect fidelity the shaping of the die opening or openings; whether the die is designed to make a single article as in Figure 12 of round, square, or other cross-section, or a plurality of articles, as in the apparatus above described and as in apparatus below described, and whether the die is designed to make hollow, cylindrical or other tubes or strips, rails, structural shapes and the like. Many of these advantages follow from the use of hydraulic power according to the invention, that is, the utilization of such power for giving the enormous pressures discovered to be required and at the same time the application of these pressures at very high speeds so that their application is completed while the billet is in a high state of plasticity; as well as from the combined use of pneumatic and hydraulic pressure to produce an almost explosive pressure on the billet metal for causing it to flow through the die openings (relation of plunger and billet diameter). The finished shape is formed at a very high rate of speed, in some instances a speed of 100 ft. per second being attained; although it will be understood that the speed of metal flow varies according to the proportionate reduction in the cross-sectional area of the billet to the cross-sectional area of the finished product or products being formed from the billet.

Further to consider at this point some of the important aspects of the method of the present invention, I have found that in the previous comparatively slow speed extrusion processes, even when the die is made of such expensive and heat-resisting alloy steels as the tungsten-alloy steels employed for tools, the surfaces of such dies showed considerable wear after a number of slow speed extrusion operations are performed at very high pressures.

The high speeds of the present invention, never before used in any hydraulic extrusion operation, solve completely the problem of die and tool wear, even when the dies and other tools are made of comparatively inexpensive metals and alloys. These high speeds shorten the contact time of the hot metal with the dies and tools to a period not more than a few seconds in every cycle of operation with a minimum operation cycle of approximately 60 seconds. In this short contact time, the heat transfer from the billet metal to the tools will not injure their surfaces in the slightest degree, for the reason that the actual pressure time can be held down to less than 3 seconds. This high velocity pressure force applied during the flow of the metal creates a phenomenon in the almost frictionless flow of the metal through the dies and around the forming tool.

The fact that the metal flow at this time is around a forming tool of sufficient diameter relative to the size of the blank and/or container to effect a substantial equalization of the inner and outer temperatures of the blank, and prevents flow back of the metal and building up of laminations, is a feature of the invention which is of considerable importance as will now be explained.

Figure 24:
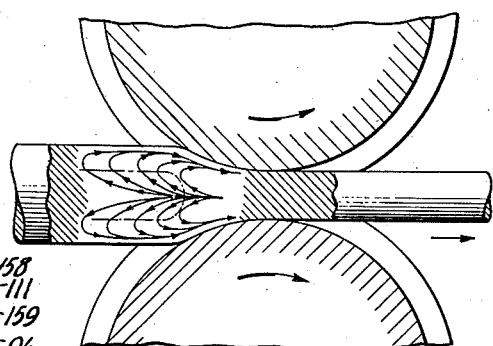
Figure 24 is a view showing the usual back flow of central metal in a blank or billet heated for hot-working by rolling and being thus worked, while the dot and dash lines therein show the new principle for preventing back flow.

Referring at this point to Figures 24, 25 and 26, in connection with Figure 12 now under discussion, it is explained that in reducing the cross sectional area of a uniformly heated billet by working or extrusion to elongate the same into one or more shapes having smaller cross sectional area than that of the billet, the reduction pressures applied to the outer surfaces of the billet directly react on the metal around the axis of the billet. There is then a tendency for the metal to flow as indicated by the arrows in Figures 24, 25 and 26, and the metal does so flow, the inner metal moving along lines directed outwardly from the axis of the billet, and rearwardly away from the extrusion opening. Due to heat radiation before the billet is housed in the container, as for instance shown in Figure 3, and thereafter due to heat transfer, by conduction to the metal parts of the container contacting the metal blank 54, the surface temperature of the metal blank drops in the ordinary extrusion process well before its inner temperature and before all, or a considerable portion of the blank is extruded through the die. There is an increasing back flow action of the inner metal of the blank as other parts of the billet metal are forced through the die during further and further elongation of the extruded article. In other words, there is continually, in the previous extrusion methods wherein slow speeds are employed and more particularly where there is no substantial equalization of the inner and outer temperatures of the blank and no redistribution of the heated metal thereof, a forcing back of the more plastic metal from the center of the blank from the die caused by the less plastic metal flowing from the surfaces of the billet, and the more plastic metal thereof flowing back into the softer section of the blank which is less compressed than the metal being forced into the orifice of the die. Laminations then begin to form from the flow back, and they exhibit themselves in the extruded articles, to weaken the latter or make of them complete rejections. These difficulties are avoided by the present invention, by redistributing the hotter inner metal of the blank; by preventing the folding back and building up of laminations; in part by the high speed of application of pressures, and in part by the explosion manner in which they are applied; all particularly efficient when the piercing and equalizing tool coacts with the die as herein described.

In this last connection, the nose 75 or 75a of this tool 42 or 42a respectively is shown as either in the die 68, as in the apparatus first described, or as coming up very close to a die 68b as in Figure 12. If the latter relation of the piercing and equalizing tool 42a to the die 68a is maintained during the entire extrusion operation, as provided by the present invention, the tool serves the important function of preventing the choking of the metal in the mouth of the die to allow the same to flow freely into the die orifice 95a and prevents the rearward flow and folding back of laminations in both the blank and the extruded shape as will be apparent by viewing the dot and dash lines of Figures 24, 25 and 26. Preferably the area between the end of the nose 75a and the mouth of the orifice 95a is the same as the area or cross section of the extruded rod.

Now it should be particularly noted that the piercing and equalizing tool 42a (and 42) is of substantial size, preferably at least one third or more the size of the container 53 and/or the blank 54 when the latter fills the container, to effect a substantial redistribution of the hotter metal from the center of the blank and so that the considerable metal of the tool can drive considerable heat from the inner wall of the blank, and so that the inner and outer temperatures of the blank are substantially equal.

Another important feature of the invention, especially in combination with the features just referred to, is the initial piercing of the blank, even when extruding solid shapes. As the piercing and equalizing tool 42 or 42a moves through the blank the metal from the hole so formed elongates the blank (see Figures 3 and 4) and at the same time by the displacement of the hotter metal from the center of the billet, the higher temperatures of this metal are redistributed into the thick-wall which the now tubular billet presents, by the back flow of the metal around the piercer.

Otherwise stated, the very seriously objectional actions graphically shown by the central arrows of Figures 24, 25 and 26 do not occur, or rather, while somewhat similar metal flows occur, they are guided in a direction such that they will be helpful rather than hurtful in effecting the distribution of heat, and consequently of plasticity, through the blank radially thereof in all portions.

All these beneficial results are also obtained in a die for making a plurality of articles, whether these articles be solid or tubular, such dies, for instance, as are here shown in Figures 16–21. If multiple rods are extruded in the apparatus shown in Figures 1–6, without the equalizing tool 42 provided by the present invention, there would be a folding back of metal into the softer center section of the billet and the adverse formation of laminations. However, with the equalizing tool provided by the present invention, the temperature of the metal is substantially equal all around each die orifice and consequently folding back and laminations are eliminated.

Figure 13:
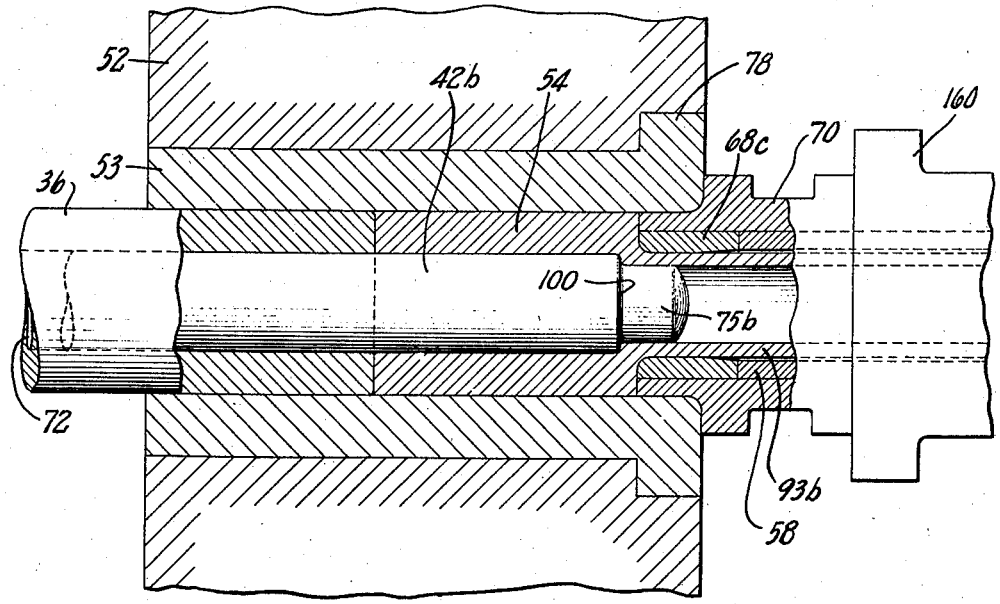
Figure 13 is a view similar to Figure 12, showing such flow principle as applied to the production of a single tube.

The same beneficial results are obtained when, as in Figure 13, a single tube is being extruded through the die here shown. The nose 75b of piercing and equalizing tool 42b is entered well into the opening in the die 68c, such nose then incidentally providing a forming mandrel for the inner shape of tube 93b. A shoulder 100 thereon tends to prevent folding back and laminations, and the enlarged diameter thereof, as hereinbefore described effects a substantial redistribution of the hotter inner metal of the blank through the tube blank. The enlarged diameter, represented by the shoulder 100 also advantageously reduces the cross section area of the metal blank and thereby lessens the amount of pressure applied during extrusion.

Referring next to Figures 14 and 15, the main parts in these views correspond to parts in Figures 1 to 6 and are similarly numbered. The die 68 is for the making of a plurality of solid rods. In this type of apparatus, the compound indirect method of extrusion is employed, that is, following the piercing operation by the piercing tool 42, and the entering of the nose 75 of that tool into a central opening in the die, a piercing operation similar to that described above in connection with Figures 1, 2, 3 and 4, the die and the ram are moved toward each other to endwise compress the billet for extrusion through the outer openings in the die, but during this operation, performed with high pressure quick action and explosively applied strokes of these moving parts characteristic of the invention, there is no relative movement between the ram 36 and, container 53 and billet 54. In other words, these two parts move as one unit. As soon as the piercing operation is completed, the ram 36 and the container 53 are positively locked together by a U-shaped yoke 101 thrust toward the axis of the ram so that the bowl of such U yoke and the adjacent legs thereof seat themselves, as shown, in a circumferential recess 102 on the ram. This yoke at the proper instant is thrust into said recess by a piston (not shown) in a fluid pressure cylinder 103 to the outer end of the plunger 104 of which is secured said yoke. This cylinder is carried by the cross head 52 for the container by way of a bracket 103' on said cross-head.

In Figure 15, the ram 36 and the container 53 are shown still locked together at the very conclusion of the extrusion operation; at appropriate times cylinder 103 retracts the yoke 101 from the ram 36 and allows relative movement between the ram and the container to return these parts to the positions by pistons 34 and 51 which they should occupy at the starting of another extrusion operation.

Referring next to Figures 20 and 21, illustrating an application of the invention in the manufacture of flat-strip blanks 105 in multiple, here, although the ram is not shown, the blank 54 is being extruded into such blanks through arcuate holes or orifices 95c in a die 68d. This die 68d is set in the recess 69 of the die head 70 backed up by an ejector 58 as heretofore described.

The extruded articles are flattened, and otherwise shaped as required, as to edge and corner deformations set up during the flattening operation, in any known or suitable way. In the present case, the die 68d is shown of two-part construction to facilitate accurate machining of the forming openings, which here are not only arcuate, but considerably longer in the direction of the arcs than radially of the latter.

An inner die member 107 is provided with a plurality of radially projecting square headed extensions 109. The portions of these extensions below said heads provide the end walls for strip-forming openings, and said heads fit into rectangular recesses 110 milled outwardly from a single bore through the outer die member 108. The pressure of the flowing billet metal during the extrusion operation is prevented from dislodging said heads from their recesses, that is, from moving the two die members relatively in a direction axially of the die, by the ejector 58. Rearward movement of the ejector and its crosshead 57 is limited by engaging the end wall of the die carrier 160 mounted on the cross-head 57.

Figures 22 and 23 illustrate a use of the invention for the extrusion in multiple of hollow products, that is, tubes, or quasi-tubes such for instance as channels, and wherein the blank metal flow controlling features of the invention herein above discussed in connection with Figures 24, 25 and 26 are further developed by equalizing the various simultaneously flowing portions of the metal and applying proper subdivisions thereof to zones individual to the neighborhoods of entry of such metal into the different openings of the die, each for forming a separate one of said hollow objects. For convenience, these extruded objects are here shown as cylindrical tubes 111. In Figure 22 is illustrated the multiple production of tubes by direct extrusion since the die 68 will move with the container 53. The operating parts such as the die 68, die head 70, ejector 58, ram 36, equalizer 42, and various other parts are the same as those described hereinbefore in connection with making solid shapes in multiple. The main point of difference is that the face block 99 is replaced with a head 112 carrying forming mandrels 113 of equal number and in location to centrally enter die orifices 95. A key 114 may be provided to locate the mandrels 113. On the other hand, Figure 23 illustrates the same parts for indirect extrusion, wherein the die is moved into the container as described in detail in connection with Figures 14 and 15.

Since any one or more of the ram 36, container 53, and die 68 in the apparatus herein disclosed can move with relation to another or others as desired, this can be taken as illustrating the applicability of the features of the invention which have to do with controlling the metal flow of the billet during extrusion under such comparatively difficult conditions as the forming of hollow bodies in multiple, by direct and indirect extrusion, and by simple extrusion wherein all the power movements occur from one side, or compound wherein the power movements occur from both sides concurrently.

Referring now to the metal flow controlling principle hereinbefore mentioned, as disclosed in Figures 22 and 23, the piercing and equalizing tool 42 is shown as equipped with a head 112 to present a considerable radially extended metal flow controlling shoulder surrounding a slightly enlarged root portion of what may be called the lesser or piercing true nose 75. This latter nose is shown as entered, according to the invention, in a central opening in the die 68. The piercing and equalizing tool 42, to obtain the best results, so far as present experiments have gone, should have a diameter of at least one-third that of the blank. As a very desirable feature, also, the equalizer is provided with channels 115 of a special shape, and as illustrated. These channels are spaced around the equalizer about as the forming openings of the die are spaced therearound, and with all the channels inclined toward the axis of the tool 42 and around the forming mandrels 113 as these channels extend toward the die.

The tool 42 serves to redistribute the hotter inner metal more evenly throughout the blank, to prevent folding back and laminations, and reduces the cross sectional area of the blank so that lower extrusion pressures may be used as hereinbefore described in detail. Stripping of the tubes 111 with the tool 81 is also accomplished in the manner hereinbefore described.

From what has already been said, the method of the invention and its salient features should now be clear. However, briefly summarized, it may be stated that the present invention discloses a process and apparatus to: (1) redistribute the hotter inner plastic metal of the blank; (2) substantially equalize the inner and outer temperature of the plastic blank; (3) prevent flowing metal from folding back and forming laminations; (4) greatly reduce the scrap; (5) pierce a plastic blank prior to extruding solid shapes; (6) extrude in a high speed manner by apparatus working at a normal speed, by compound and opposed movements; (7) eject the die automatically; (8) novel process and apparatus for extruding both solid and hollow shapes in multiple.

Single cylinders and pistons instead of double cylinders and pistons may be used if preferred.

Having thus described the invention, what is claimed as new, is:

1. The process of extruding metal shapes which involves the steps of placing a heated and plastic metal blank into the chamber of a container; confining the blank in the container with a die and a ram at opposite ends of the chamber; forcing a tool which is so proportioned relative to the size of the metal blank when it fills the chamber into the metal blank, and into predetermined relation to the die as to effect a marked approach toward equalizing the inner and outer temperatures thereof; and of simultaneously moving the die and the ram toward each other to compress the blank within the chamber and to extrude the plastic metal of the blank through the die.

2. The process of extruding solid metal shapes which involves the steps of placing a heated and plastic metal blank into the chamber of a container; confining the metal blank with a die and a ram at opposite ends of the chamber; forcing a tool which is so proportioned relative to the size of the metal blank when it fills the chamber into the metal blank as to effect a marked approach toward equalizing the inner and outer temperatures thereof and of maintaining the end of the tool out of and in predetermined spaced relation to a shape forming orifice in the die; and compressing said blank in the chamber to extrude the metal thereof through the die.

3. The process of extruding metal shapes which involves the steps of placing a heated and plastic metal blank into the chamber of a container; confining the blank in the container with a die having a plurality of shape-forming orifices; forcing a tool which is so proportioned relative to the size of the blank when it fills the chamber into the metal blank as to effect a marked approach toward equalizing the inner and outer temperatures thereof; and compressing said blank in said chamber to extrude the plastic metal thereof through the plurality of orifices to form a plurality of metal shapes.

4. The process of extruding metal shapes which comprises the steps of placing a heated and plastic metal blank into the chamber of a container; confining the blank in the container with a die and a ram at opposite ends of the chamber; equalizing the temperature of said heated blank by forcing a tool which is at least one third the size of the chamber into the center of the metal blank, and into predetermined relation to the die; and of moving the tool, die and the container with the blank therein in one direction and simultaneously moving the ram in a counter direction to compress the blank within the container and to extrude the metal thereof through the die.

5. The process of extruding metal shapes which comprises the steps of placing a heated and plastic metal blank into the chamber of a container; confining the blank in the container with a die and a ram at opposite ends of the chamber; equalizing the temperature of said heated blank by forcing a tool which is at least one third the size of the chamber into the center of the metal blank, and into predetermined relation to the die; and simultaneously moving both the die and ram toward each other hydraulically to compress the blank within the container and to extrude the metal thereof through the die.

6. Apparatus for performing the process of claim 3 comprising in an extrusion press the combination of a ram; an equalizer tool for piercing the central portion of the blank, of sufficient size to equalize the inner and outer temperatures of the blank; a container, for supporting a heated metal blank; a die with a plurality of shape-forming orifices; and means for moving the equalizer through the blank and for moving the ram and die toward each other simultaneously to extrude metal of the blank through the orifices of the die to simultaneously form a plurality of solid metal shapes.

7. Apparatus for performing the process of claim 3 comprising in an extrusion press the combination of a ram; an equalizer tool for piercing the central portion of the blank, of sufficient size to equalize the inner and outer temperatures of the blank; a container for supporting a heated and plastic metal blank; a die with a plurality of shape-forming orifices; a plurality of forming mandrels on the end of the equalizer aligned with the orifices of the die; and means for moving the equalizer with the associated forming mandrels into predetermined relation with the die and for moving the ram and die toward each other to compress the blank in the container and to extrude the plastic metal thereof around the forming mandrels and through the die orifices to simultaneously form a plurality of hollow metal shapes.

8. The process of extruding metal shapes which comprises the steps of placing a heated and plastic metal blank into the chamber of a container having a die; equalizing the temperature of said blank by forcing a tool which is at least one third the size of the chamber into the center of the metal blank; arresting relative movement between the tool and the die; and compressing said blank in the chamber to extrude the plastic metal thereof through the die.

9. The process of extruding metal shapes which comprises the steps of placing a heated and plastic metal blank into the chamber of a container; confining the blank in the container with a die and a ram at opposite ends of the chamber; equalizing the temperature of said heated blank by forcing a tool which is at least one third the size of the chamber into the center of the metal blank, and into predetermined relation to the die; and simultaneously moving the die and ram toward each other to compress the blank within the chamber and to extrude the plastic metal of the blank through the die.

10. The process of extruding solid metal shapes which comprises the steps of placing a heated and plastic metal blank into the chamber of a container; confining the metal blank with a die and a ram at opposite ends of the chamber; equalizing the temperature of the blank by forcing a tool which is at least one third the size of the chamber into the center of the metal blank and maintaining the end of the tool out of and in predetermined spaced relation relative to a shape-forming orifice in the die; and compressing said blank in the chamber to extrude the metal thereof through the die.

11. The process of extruding hollow metal shapes which comprises the steps of placing a heated and plastic metal blank into the chamber of a container; confining the metal blank with a die and a ram at opposite ends of the chamber; equalizing the temperature of the blank by forcing a tool which is at least one third the size of the chamber with a reduced forming mandrel into the center of the metal blank with the reduced forming mandrel maintained within and in predetermined relation to a shape-forming orifice in the die; and compressing said blank in the die.

12. The process of extruding metal shapes which comprises the steps of placing a heated and plastic metal blank into the chamber of a container; confining the blank in the container with a die, in one end of the chamber, having a plurality of shape-forming orifices; equalizing the temperature of said blank by forcing a tool which is at least one third the size of the chamber into the center of the metal blank; and compressing said blank in said chamber to extrude the plastic metal thereof through the plurality of orifices.

13. In an extrusion apparatus, the combination of a die; a nest for the die; and power actuated ejecting means for automatically removing the die and for preparing the nest to receive another die, said ejecting means including a means for guiding and supporting the extruded metal as it issues from the die.

14. The process of extruding metal shapes which involves the steps of placing a heated and plastic metal blank into the chamber of a container; confining the blank in the container with a die having a plurality of shape-forming orifices; forcing through the central portion of the blank a tool having a plurality of forming mandrels which extend therefrom to enter the shape forming orifices, said tool being so proportioned relative to the size of the blank when it fills the container as to effect a marked approach toward equalizing the inner and outer temperatures of the blank; and compressing said blank in said chamber to extrude the plastic metal thereof around the plurality of forming mandrels and through the plurality of orifices to form a plurality of hollow metal shapes.

15. The process of extruding metal shapes which comprises the steps of placing a heated and plastic metal blank into the chamber of a container; confining the blank in the container with a die, in one end of the chamber having a plurality of shape-forming orifices; equalizing the temperature of said blank by forcing into the center of the metal blank a tool having a plurality of forming mandrels which extend therefrom to enter the shape-forming orifices, said tool being at least one third the size of the blank when it fills the container; and compressing said blank in said chamber to extrude the plastic metal thereof around the plurality of forming mandrels and through the plurality of orifices.

16. The process of extruding metal shapes which involves the steps of placing a heated and plastic metal blank into the chamber of a container; confining the blank in the container with a die having a plurality of circumferentially disposed shape-forming orifices; forcing a tool which is so proportioned relative to the size of the blank when it fills the chamber into the metal blank as to effect a marked approach toward equalizing the inner and outer temperatures thereof; and compressing said blank in said chamber to extrude the plastic metal thereof through the plurality of orifices to form a plurality of metal shapes.

17. An apparatus for extruding metal shapes, comprising in an extrusion press the combination of a container adapted to be charged with a heated metal blank; a die; a ram; an equalizer tool of at least one third the size of the blank when it fills the container, for piercing the central portion of the blank; means for moving said equalizer tool through said blank; and means for subsequently compressing said blank between said ram and said die to extrude the metal through said die.

18. An apparatus for extruding metal shapes, comprising in an extrusion press the combination of a container adapted to be charged with a heated metal blank; a die; a ram; an equalizer tool for piercing the central portion of said blank, said tool being so proportioned relative to the size of the blank when it fills the container as to effect a marked equalization of the inner and outer temperatures of the blank; a shoulder on said equalizer tool, facing said die; a nose of reduced size on said equalizing tool, adapted when in a predetermined position with respect to said die to form a shape-forming orifice for the extrusion therethrough of a hollow metal shape; means for moving the equalizer tool through said blank to position said nose relative to said die; means for arresting relative movement between said tool and said die when said shoulder is in a predetermined position spaced from, out of and facing said die; and means for subsequently compressing said blank between said ram and said die to extrude the metal through said die.

19. An apparatus for extruding metal shapes, comprising in an extrusion press the combination of a container adapted to be charged with a heated metal blank; a die; a ram; an equalizer tool of at least one third the size of the blank when it fills the container, for piercing the central portion of the blank; means for effecting relative movement of said tool and said die, to cause said tool to pierce said blank; means for arresting relative movement of said tool and die in predetermined relation; and means for subsequently compressing said blank between said ram and said die to extrude the metal through said die.

20. An apparatus for extruding solid metal shapes, comprising in an extrusion press the combination of a container adapted to be charged with a heated metal blank; a die; a ram; an equalizer tool for piercing the central portion of the blank, so proportioned relative to the size of the blank when it fills the container as to effect a marked equalization of the inner and outer temperatures of the blank; means for effecting relative movement of said tool and said die, to cause said tool to pierce said blank; means for arresting relative movement of said tool and die in predetermined relation, with the tool spaced from and out of said die; and means for subsequently compressing said blank between said ram and said die to extrude the metal through said die.

21. The process of extruding metal shapes which includes the steps of placing a heated and plastic metal blank into the chamber of a container; forcing into the metal blank a tool which is so proportioned relative to the size of the blank when it fills the chamber as to effect a marked approach toward equalizing the inner and the outer temperatures thereof; and compressing the metal blank in the chamber to extrude the metal therefrom by projecting the container and blank in one direction and simultaneously projecting a die into the moving container in a counter direction.

22. The process of extruding metal shapes which includes the steps of placing a heated and plastic metal blank into the chamber of a container; forcing into the metal blank a tool which is so proportioned relative to the size of the blank when it fills the chamber as to effect a marked approach toward equalizing the inner and the outer temperatures thereof; and compressing the metal blank in the chamber to extrude the metal therefrom by moving the container and blank therein and the associated die and mandrel conjointly in one direction and concurrently moving a ram into the chamber in a counter direction.

STANLEY W. SPARKS.